United States Patent [19]

Devos et al.

[11] 4,359,528

[45] Nov. 16, 1982

[54] CORN STEEPING PROCESS FOR PRODUCTS THUS OBTAINED AND THEIR USE IN THE MANUFACTURE OF PENICILLIN

[75] Inventors: Francis Devos, Merville; Patrick Beuque, Aubers; Michel Huchette, Merville, all of France

[73] Assignee: Roquette Freres, Lestrem, France

[21] Appl. No.: 182,081

[22] Filed: Aug. 28, 1980

[30] Foreign Application Priority Data

Sep. 4, 1979 [FR] France .................. 79 22106

[51] Int. Cl.$^3$ .......................... C13L 1/00; C13L 1/06
[52] U.S. Cl. .................................. 435/43; 435/254; 127/28; 127/68
[58] Field of Search ................ 435/254, 93, 933, 163, 435/165, 43; 127/68, 28; 426/431, 436, 44, 54

[56] References Cited

U.S. PATENT DOCUMENTS

| | | | |
|---|---|---|---|
| 2,232,555 | 2/1941 | Musher ................................ | 99/36 |
| 2,322,413 | 6/1943 | Bishop et al. ...................... | 127/68 |
| 2,444,176 | 6/1948 | Thomas et al. .................... | 435/254 X |
| 2,448,680 | 9/1948 | Myers et al. ....................... | 435/254 X |
| 2,515,157 | 7/1950 | Parsons .............................. | 435/254 |
| 4,086,135 | 4/1978 | Balana et al. ...................... | 127/68 X |
| 4,129,665 | 12/1978 | Clark .................................. | 426/431 X |

FOREIGN PATENT DOCUMENTS 523530 4/1956 Canada .................................. 435/254
1238725 7/1971 United Kingdom .

OTHER PUBLICATIONS

Die Starke, vol. 27, No. 3, (1975), M. El-Marsafy et al., "Evaluation of Various Brands of Corn Steep Liquor for Penicillin Production", pp. 91–93.
Die Starke, vol. 27, No. 12, (1975), Hani M. Elsaied et al., "Amion Acid Patterns of Different Brands of Corn Steep Liquor", pp. 413–416.
Die Starke, vol. 31, No. 3, (1979), M. Roushdi et al., "Factors Improving the Steeping Process of Corn Grains", pp. 78–81.

Primary Examiner—Kenneth M. Schor
Attorney, Agent, or Firm—Larson and Taylor

[57] ABSTRACT

The invention relates to a corn-steeping process. In this process the temperature of the steeping water decreases from silo to silo and the cycling ratio is comprised between 0.8 and 1.2 m$^3$ per ton of commercial corn.

The Corn-Steep obtained can be applied especially in the manufacture of penicillin.

10 Claims, 14 Drawing Figures

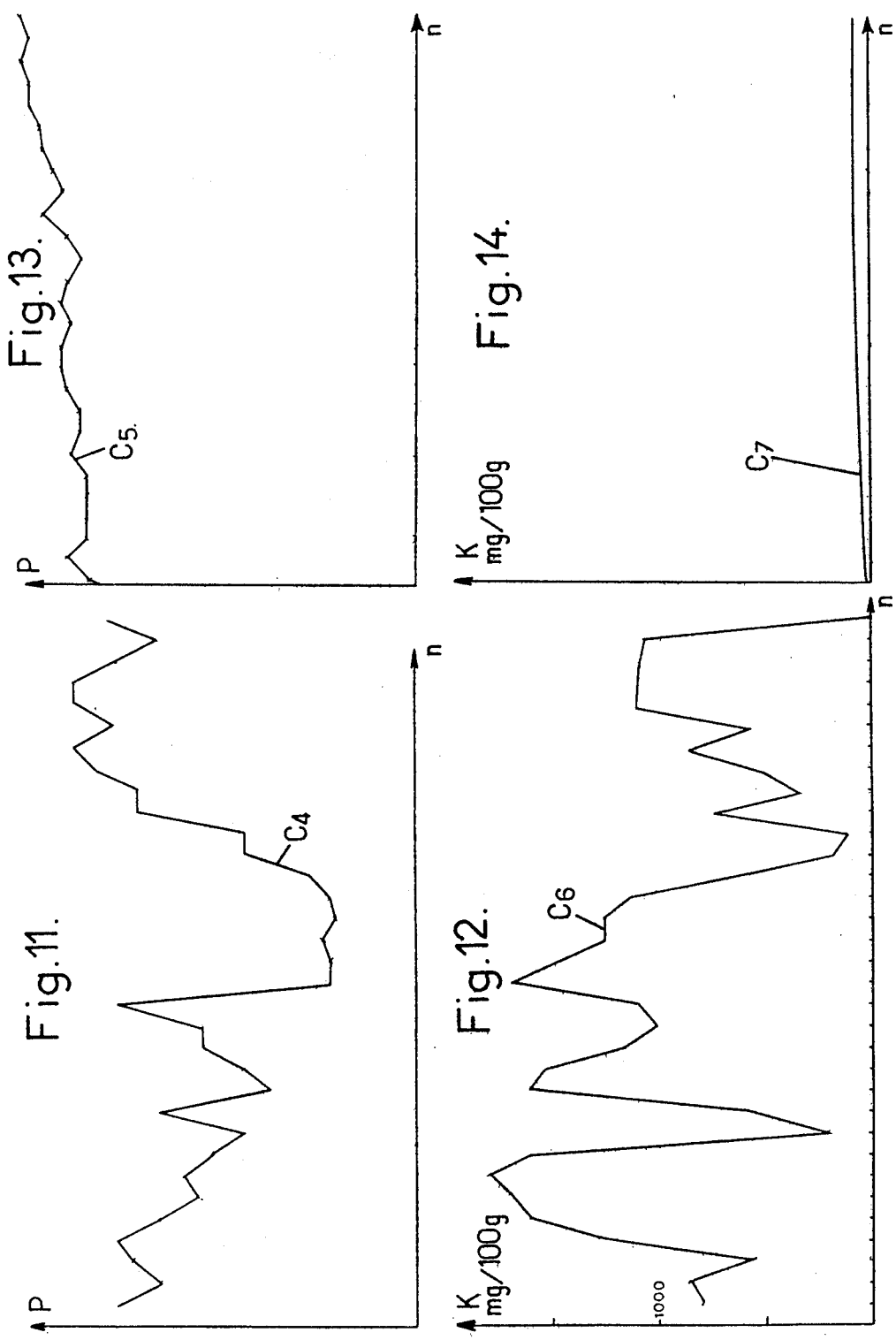

CORN STEEPING PROCESS FOR PRODUCTS THUS OBTAINED AND THEIR USE IN THE MANUFACTURE OF PENICILLIN

The invention relates to a corn steeping.

It relates also to the products, namely the steep waters, having the characteristics of those obtained by the application of this process, as well as their use for the manufacture of penicillin; steeping or steep water is frequently designated by the technician skilled in the art as "Corn-Steep", which expression will be used in the following description.

The steeping or soaking of the corn in water constitutes the first step in the extraction of starch in wet starch works. This steeping enables the swelling of the corn grain and the removal of highly fermentable soluble matter contained in this grain.

It consists of maintaining the corn placed in silos for a given time ("steep time") in hot water containing a small mount of sulfur dioxide. In practice, the silos are arranged in series and the steep water traverses them one after the other, a given silo being emptied when the corn that it contains has been kept in contact with the steep water for the above-mentioned given time.

More particularly, the steeping water is introduced continuously into each of the silos of the series successively so that each silo receives in fact an aliquot part of this water; each aliquot part is consequently led through the whole series of silos from that into which it was introduced at the start and whose charge of corn was emptied at the end of the introduction of the corresponding aliquot part, the soaking being terminated for this charging, up to the silo situated at the other end of the series and which has just received a charge of fresh corn.

Two essential phenomena develop simultaneously in the course of soaking: the first consists of a diffusion of the soluble substances from the corn grain to the soaking water whilst the second consists of a fermentation of these soluble substances in the soaking water.

This fermentation is a lactic fermentation; in fact, the soaking conditions ($SO_2$, temperature, reducing sugars present and the like) encourage the development of lactic bacteria which grow very rapidly and eliminate the other microorganisms. Corn-Steep is hence the product resulting from simultaneous diffusion and fermentation of the solubles of the corn.

An important parameter of the steeping process is constituted by the contact time of the liquid phase with the corn; this time is regulated by what is called the "cycling ratio" of the water, that is to say, by the amount of water employed per unit weight of treated corn; in industrial practice, the cycling ratio is defined by the volume of water in $m^3$ per ton of commercial corn.

This being the case, each starch factory has its own soaking process and parameters (soaking time, cycling ratio, $SO_2$ ratio, temperature, etc.). It follows that the quality of the Corn-Steeps obtained and found on the market are very variable from one starch manufacturer to another.

But in addition, by reason of the very complex physical and biochemical phenomena which occur in the course of the soaking, which phenomena are very sensitive to the least variations in the aforesaid parameters, very considerable variations are observed in the quality of one Corn-Steep product in the same starch works in the course of a long period (six months for example). These variations are observed in respect of the color, the viscosity, the stability on storage, the content of reducing substances, but also and especially in the proportion of certain free amino-acids such as lysine, tyrosine, histidine, aspartic acid, and certain vitamins of group B.

Now, Corn-Steep is used as a source of nutrient substances in the fermentation industry, and in particular in the production of penicillin, since it is not very expensive, available in large amounts, and has an excellent balance of the majority of essential factors; lactic acid constitutes an easily assimilible carbon source, the amino-acids and the polypeptides constitute not only a source of nitrogen and of carbon but also of "buffer" agents and the ashes constitute a source of mineral elements which are needed by the microorganisms.

It happens that the variation in the quality of Corn-Steep found on the market and notably of their lysine content whose presence is not favorable for the formation of penicillin, is manifested by considerable undesirable variations in the yields of the production of antibiotics.

Now, to be able to benefit in the production of these antibiotics from all the progress of modern industrial biochemistry (genetic improvements, adjustment of pH conditions or of culture medium), it is important for the composition of the culture medium—and consequently of all its constituents—to be as constant as possible. Sudden, brisk and unexplained variations in the composition of the Corn-Steep have thus sometimes diverted biochemical industries from this raw material to the profit of a partial replacement of the Corn-Steep by other substrates, such as, for example, soya proteins and yeasts.

Conventional steeping process, whose parameter are as follows:

soaking time of about 40 hours, soaking temperature comprised between 45° C. and 52° C., sulfur dioxide ratio from 0.75 to 3 g/liter of water approximately, water cycling ratio comprised between 1.3 and 2.0 $m^3$ of water per ton of commercial corn, giving at the end of soaking a concentration of solubles of 4 to 8%, favor the swelling of the corn and the rapid diffusion of the soluble materials to the maximum, but do not permit the optimal development of lactic fermentation which occurs in the course of soaking and which is determining for the final composition of the Corn-Steep.

In order to encourage this lactic fermentation, two solutions have already been proposed.

The first consists of a complementary incubation, the soaking water with 6 to 8% of dry matter being sent to a storage tank, where it remains between 8 and 24 hours before being evaporated. This dwell time permits more through exhaustion of the soluble materials by the lactic bateria.

The second consists of seeding the soak by means of lactic bacteria, which would have the effect of reducing soaking time; the temperature of the soaking is comprised between 45° and 50° C., and the water cycling ratio used is 1.4 to 1.8 $m^3$ of water per ton for commercial corn.

None of these solutions has given entirely satisfactory results.

It is therefore a particular object of the invention to overcome the drawbacks of the prior art and to provide a corn steeping process facilitating lactic fermentation to the maximum and leading to a Corn-Steep of constant quality having an emerging from the soak a high concentration of dry matter, an almost total absence of reducing sugars, and an extremely regular composition, characterised by a very low content of free lysine, histidine, arginine, aspartic acid and tyrosine, the Corn-Steep obtained being very particularly adapted for the production of penicillin.

In the corn-steeping process according to the invention the temperature of the steeping water decreases from silo to silo between that into which it is introduced and that at the outlet from which the Corn-Steep is recovered, and the cycling ratio is comprised between 0.8 and 1.2 m$^3$ per ton of commercial corn, preferably between 0.9 and 1.1 m$^3$.

According to an advantageous embodiment of the abovesaid process, the temperature of the soaking waters decreases from at the most 58° C. in the input silo to 32° C. in the output silo, preferably from a value comprised between 52° and 56° C., notably of 55° C. in the input silo to a value comprised between 33° and 37° C., notably 35° C. in the output silo.

The Corn-Steep according to the invention is characterised by the fact that it has:

a free lysine-ornithine content less than 200 mg/100 g of dry Corn-Steep, preferably, a content of reducing sugars below 0.2 g (expressed as glucose) per 100 g of dry Corn-Steep, and, more preferentially again, a content of dry matter, before concentration, above 8%.

Apart from the abovesaid features, the invention is directed also to other features which are used preferably at the same time and which will be more explicitly considered below.

It will, in any case, be well understood by means of the additional description which follows and of the accompanying examples, said additional description and examples relating to advantageous embodiments.

An understanding of the invention will be further facilitated by the drawings in which.

Figure 1:
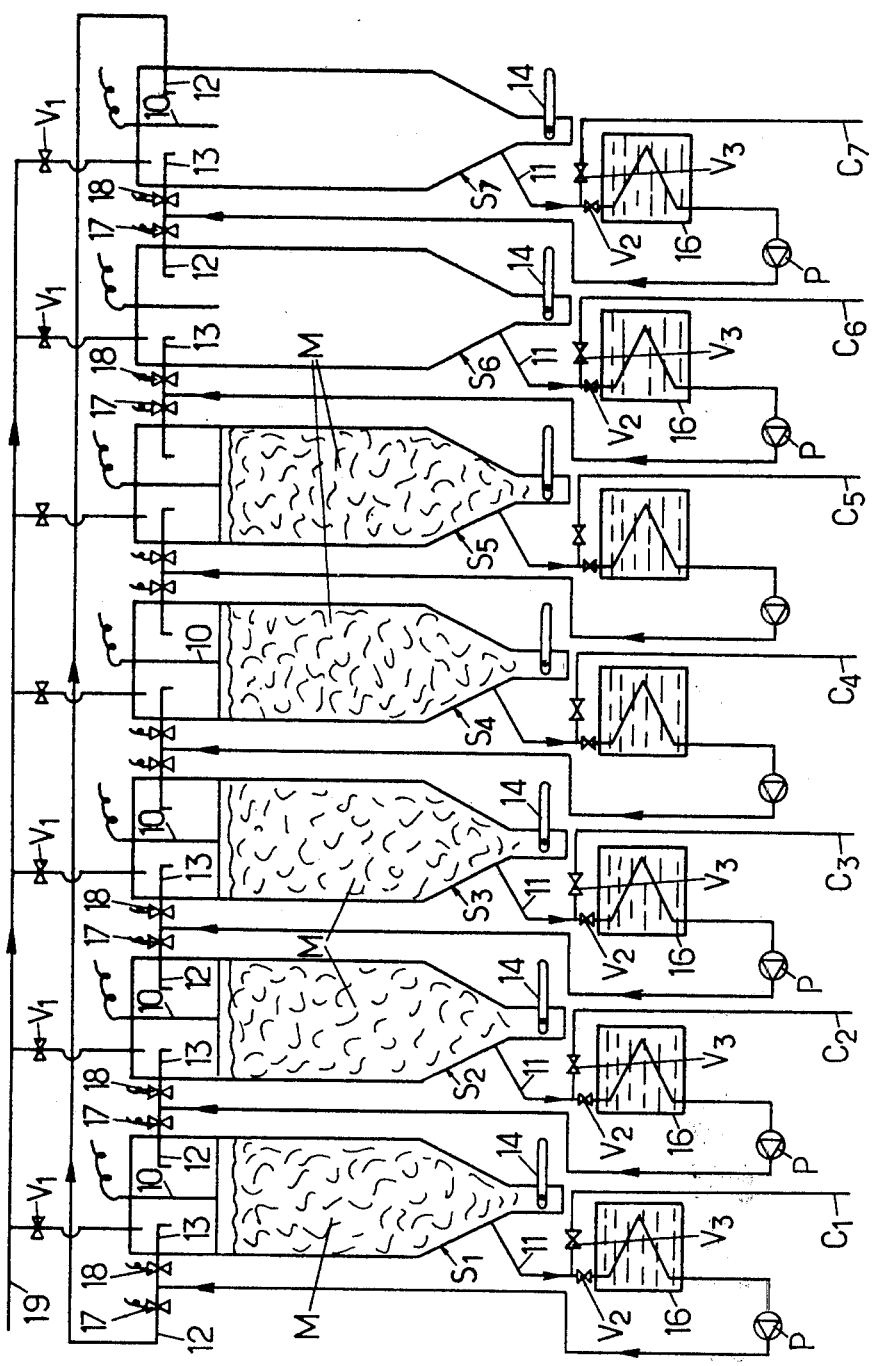
FIG. 1 is a diagrammatic side elevation view of a battery of silos used to carry out a corn-steeping process.

FIGS. 4 through 10 are aminograms of the soak water contained in, respectively, silos number 5, 9, 12, 15, 18, 22 and 2 of FIG. 1;

FIGS. 11 and 13 are curves showing the average production (P) of penicillin for each trial (n) utilizing corn steep in accordance with the prior art (FIG. 11) and with the present invention (FIG. 13); and FIGS. 12 and 14 are curves showing lysine content (k) of the corn steep of the prior art (FIG. 12) and the present invention (FIG. 13) for each trial (n).

Hence in order to proceed with the soaking of the corn, procedure is as follows or in equivalent manner.

The commercial corn grains, placed in silos arranged in series, is contacted with a soaking water containing about 2.5 g of SO$_2$ per liter.

The temperature of the soaking water decreases from silo to silo progressively as it passes through them from one to the other from that into which this water is introduced up to that, located at the other end of the series, at the outlet of which the Corn-Steep is recovered.

The fresh sulfited water is introduced successively into each of the silos of the series, it being understood that this water is customarily constituted by what is denoted in the art by the expression "return waters" from starch manufacture to which sulfurous anhydride is added.

The temperature of the sulfited water on its introduction is at the most about 58° C., preferably comprised between 52° and 56° C. This temperature decreases from silo to silo to arrive, in the last silo, at the outlet from which it is recovered in the form of Corn-Steep at a value which can drop down to about 32° C. but which, preferably, is comprised between 33° and 37° C.

To arrange so that the Corn-Steep obtained on emerging from the soaking corresponds with the desired objectives of the invention, recourse should be had not only to the decreasing temperature profile which has just been defined, but also to the choice of a cycling ratio of the order of 0.8 to 1.2 m$^3$ per ton of corn, preferably from 0.9 to 1.1 m$^3$.

Taking into account, in addition, the fact that the contact time of the liquid phase and of the corn put to soak must be at least 38 hours, preferably at least 40 hours, one is lead to chose a soak time comprised between 24 and 44 hours approximately.

For a cycling ratio of about 1 m$^3$, the soak time can advantageously be from about 35 to 40 hours.

The steeping water obtained has thus undergone a sufficiently long fermentation and is found to be suitably exhausted in reducing sugars and in free lysine.

This result is obtained in particular by means of the increase in the time of fermentation which occurs within the liquid phase and of which the duration is found to be increased as a result of the reduction in the cycling ratio.

From a general point of view, the Corn-Steep according to the invention and obtained notably by means of the process according to the invention, has:

a free lysine-ornithine content below 200 mg/100 g of dry Corn-Steep,

Preferably, a reducing sugar content below 0.2 g (expressed as glucose) per 100 g of dry Corn-Steep, and, more preferably again, a content of dry matter, before concentration, above 8%.

The content of other amino acids is preferably the following:

arginine < 50 mg/100 g of dry product
histidine < 100 mg/100 g of dry product
tyrosine < 150 mg/100 g of dry product
aspartic acid < 150 mg/100 g of dry product.

With respect to the prior art processes in which the temperature of the soaking water is the same in all the silos of the battery and in which the cycling ratio is distinctly higher, the process according to the invention not only provides a Corn-Steep of a quality which is no longer variable but on the other hand which is constant and particularly suited to the manufacture of penicillin but, in addition, it has other important advantages.

Thus, the reduction in the water cycling ratio permits a considerable elevation in the concentration of the soaking waters, which results in notable economy in energy on the concentration of the Corn-Steep up to 50% of dry matter. The concentration at the output from soaking of about 4 to 8% in conventional processes thus passes in fact from about 8 to 13% in the process according to the invention. By taking as hypothesis a hydration ratio of 44 to 48% for the corn at the end of soaking and a content of soluble matter of 6% in the corn, a gain of about 400 to 500 liters of water to be evaporated per ton of commercial corn can thus be realised by reducing the cycling ratio from 1.5 (conventional processes) to 1.0 m³/ton (process according to the invention).

Another advantage results from the economy in energy realised due to the fact that the temperature decreases from the first to the last silo concerned at a given moment.

In fact, in conventional processes, the temperature being the same, of the order of 48°–50° C. in all the silos, it is necessary not only to heat the fresh soaking waters but also the silos newly placed in soaking operation, to bring them to this temperature of 48° to 50° C., the corn put to soak being at a temperature of about 10° to 20° C.; in addition, this temperature must be maintained in the intermediate silos.

It is true that the maintenance of a uniform temperature in all the silos of the battery is favorable to the growth of lactic bacteria; but it facilitates, in addition, the diffusion phenomenon of the highly fermentable soluble substances at the beginning of the soaking of the corn. The latter diffuse therefore to rapidly from the fresh corn put to soak.

The temperature profile according to the invention of at the most 58° C. in the input silo to 32° C. in the output silo, preferably a value comprised between 52° and 56° C., notably 55° C. in the input silo to a value comprised between 33° and 37° C., notably 35° C. in the output silo, enables the production of better balance between the two essential phenomena of diffusion and fermentation. This particular temperature gradient has in addition the advantage of being obtained very simply and naturally, by simple thermal equilibrium between the corn coming back to ordinary temperature and the sulfited water at 55° C.–58° C. flowing in countercurrent.

The two conjoint characteristics according to the invention, that is to say the low water cycling ratio and the particular temperature profile, thus enable, in addition to an almost total disappearance of the reducing sugars converted into lactic acid (ensuring through this fact excellent stability on storage of the evaporated Corn-Steep), maximum exhaustion of certain aminoacids essential for the growth of the lactic flora of the soak, in the event the lysine, histidine, arginine, aspartic acid and tyrosine.

The Corn-Steep according to the invention, outside of the fact that it is obtained at a higher concentration before evaporation and that it shows an almost total absence of reducing sugars and hence excellent stability, is hence very particularly adapted to penicillin manufacture.

This Corn-Steep is peptonised to the maximum (high amino nitrogen/total nitrogen ratio) and hence very easily assimilable by the microorganisms.

To illustrate the foregoing, there are indicated below some examples of the application of the process according to the invention and some compositions of the Corn-Steep obtained according to this process are given.

EXAMPLE 1

In order to study the influence of the principal operational parameters, steeping tests of the corn have been carried out for several months in an experimental battery of silos.

This battery comprises, as shown in FIG. 1:

seven silos $S_1$ to $S_7$ of stainless steel, with a filtering base, of 33 liters total volume and diameter equal to 25 cm, which can be filled with corn M and which are equipped with:

a level detector 10, a piping 11 connecting the base of a given silo, on the one hand, to the head of the following silo through a pipe 12 and, on the other hand, to the head of the silo itself through a pipe 13 ensuring the recycling of the liquid phase into the silo itself or to the following silo, this piping also serving to withdraw the soaking water at a given time, a bottom value 14 of large diameter for emptying the corn, seven thermoregulated water-baths 16 with as many circulating pumps P ensuring the flow of the liquid phase from a given silo through the heating coil to the following silo or to the head of the silo concerned, seven sets of two electrovalves 17 and 18 placed respectively on the pipes 12 and 13 and controlled by the level detector (ensuring complete covering of the corn and the movement of the liquid throughout the length of the battery), an inlet pipe 19 for sulfited water, adjusted to 1.5 g/l of sulfurous anhydride, from which the sulfited water is distributed at a constant flow rate, ensuring a constant cycling ratio (liters of water per kg of corn), successively to each silo, by the opening of the corresponding valve $V_1$, a tank (not shown) of 20 liters receiving the steep water from the silos before crushing of the corn and connected to each of the silos through the pipes $C_1$ to $C_7$ respectively branched to the pipes 11 of each silo, the orientation of the steeping water emerging from a given silo to the piping 11 or the pipe C being ensured by means of a valve $V_2$ and $V_3$ respectively, an evaporator (not shown) (of the type marketed by KURT HERBERT Apparate- und Maschinenbau Lahr, Baden).

Each day, the steep water collected is evaporated to 50% of dry matter by means of this evaporator under vacuum, at a temperature below 60° C.

In this first experiment, the influence of the water cycling ratio was determined.

The corn processed was French corn, coming from the 1978 harvest in southwest France. The soak time selected was 40 hours and the $SO_2$ ratio was fixed at 1.5 g/liter.

The temperature was fixed at 48° C.±1 throughout the battery. The time of 40 hours was obtained for a treatment in five silos with an emptying every eight hours.

The water cycling ratio was progressively raised from 0.8 to 1.0–1.5 and 1.8 liters of water per kg of commercial corn.

The concentration of soluble material, expressed in g/l, was measured at the outlet of the soak water. The relative bacterial activity (R.B.A.) was also determined, by the method described in the article of S. A. WATSON, Y. HIRATA and C. B. WILLIAMS in "Cereal Chemistry" September 1955, vol. 32, page 383.

Table I shows the results obtained on the soak water, as a function of the different cycling ratios tried.

TABLE I

| Cycling ratio (1 kg of corn) | 0.8 | 1.0 | 1.5 | 1.8 |
|---|---|---|---|---|
| Concentration of the soak water output g/l | 125 | 110 | 75 | 55 |
| R. B. A. | 900 | 600 | 450 | 200 |

It can be noted that the concentration of soak water and the relative bacterial activity diminish progressively as the cyclic ratio increases.

The influence of the $SO_2$, kept at a constant level equal to 1.5 g/l is, in fact, more and more sensible in the soak proportionately as the cycling ratio increases and as the average dwell time of the liquid phase outside the corn grain diminishes correlatively. The fermentation zone is thus more and more disfavored.

Chemical analysis of the Corn-Steeps evaporated to 50% of dry matter was also carried out. Table II summarizes the results obtained.

TABLE II

| Cycling ratio (l/kg corn) | 0.8 | 1.0 | 1.5 | 1.8 |
|---|---|---|---|---|
| Dry matter | 50 | 50 | 50 | 50 |
| pH | 4.2 | 4.2 | 4.25 | 4.30 |
| Acidity (g of lactic acid/100g dry matter) | 22.2 | 23.0 | 22.0 | 20.0 |
| Reducing sugars (g of glucose/ 100 g dry matter) | traces | 0.5 | 2.7 | 5.8 |
| Proteins N × 6.25 (g/100 g dry matter) | 42.0 | 41.8 | 42.3 | 41.8 |
| Color | pale | pale | colored | highly colored |
| Viscosity | viscous | viscous | fluid | very fluid |
| Stability on storage | very stable | very stable | start of fermentation | abundant alcoholic fermentation |

This analysis was completed by analysis of the amino-acids, carried out after diluent and filtration of the soak water (see Table III).

TABLE III

| | Content in mg/100g of dry matter per | | | |
|---|---|---|---|---|
| Free amino-acids | 0,8 l/kg | 1 l/kg | 1,5 l/kg | 1,8 l/kg |
| Lysine + Ornithine | 125 | 637 | 762 | 980 |
| Histidine | 40 | 43 | 180 | 470 |
| Arginine | 85 | 130 | 980 | 1580 |
| Asparatic acid | 105 | 150 | 560 | 980 |
| Threonine | 935 | 967 | 1000 | 1150 |
| Serine | 895 | 643 | 740 | 1000 |
| Glutamic acid | 310 | 1570 | 1500 | 1470 |
| Proline | 1125 | 1548 | 1230 | 1080 |
| Glycine | 770 | 540 | 610 | 550 |
| Alanine | 2250 | 2575 | 2100 | 1855 |
| Cystine | — | — | — | — |
| Valine | 1060 | 1280 | 1160 | 1000 |
| Methionine | 330 | 453 | 448 | 560 |
| Isoleucine | 540 | 482 | 470 | 490 |
| Leucine | 1770 | 1730 | 1840 | 2050 |
| Tyrosine | 0 | 50 | 380 | 530 |
| Phenyl alanine | 415 | 730 | 750 | 840 |

These analyses show how much, starting from the same corn, the soaking conditions applied can cause the composition of the Corn-Steeps obtained to vary considerably.

It can be observed that the soak conditions generally accepted in wet starch manufacture, that is to say a linear temperature profile of 48°–50° C. and a cycling ratio of 1.4 to 1.6 $m^3$ of water per ton of commercial corn, lead to the production of an incompletely fermented Corn-Steep, characterised by the presence of reducing sugars and consequently by great instability on storage.

It will be observed, on the other hand, that the composition in free amino-acids of the Corn-Steep, derived from the same quality of corn processed, varies greatly according to the water cycling ratio. These variations are particularly sensitive to the lysine, histidine, arginine, aspartic acid and tyrosine, whose content increases as the lactic fermentation becomes disfavored by a great water circulation.

The free lysine ratio (including the ornithine content) thus passes from 125 mg/100 g to 980 mg/100 g on increasing the cycling ratio from 0.8 to 1.8 liter of water per kilog of commercial corn.

EXAMPLE 2

In this example, the influence of the temperature profile was studied.

The experimentation was carried out on the same equipment as that of Example 1 and with the same quality of corn.

For a soak time of 40 hours, a water cycling ratio of 1.0 l/kg of corn for a concentration of $SO_2$ of 1.5 g/l, three tests were carried out with different temperature profiles:

54° C. throughout the soak,
48° C. throughout the soak,
55° C.-50° C.-48° C.-45° C. and 35° C. on the five silos in service, starting from the silo receiving fresh sulfited water.

Table IV indicates the dry matter and the R.V.A. measured under these conditions for the Corn-Steep at the soak outlet.

TABLE IV

| Temperature (°C.) | 54° | 48° | 55°→35° |
|---|---|---|---|
| Concentration of soak water (g/l) | 110 | 110 | 115 |
| R. B. A. | 300 | 600 | 1100 |

The fermentation is hence very highly favored by the dropping temperature profile from 55° C. to 35° C.

This is confirmed by the analyses presented in Table V, where an almost total absence of reducing sugars in the Corn-Steep obtained by means of the process according to the invention is to be essentially noted.

TABLE V

| Temperature (°C.) | 54° | 48° | 55°→35° |
|---|---|---|---|
| Dry matter | 50 | 50 | 50 |
| pH | 4,3 | 4,2 | 4,0 |
| Acidity (g of lactic acid/100 g dry matter) | 18,0 | 23,2 | 23,5 |
| Reducing sugars (g of glucose/100 g dry matter) | 8,0 | 1,0 | traces |
| Proteins N × 6,25 (g/100 g dry matter) | 41,5 | 42,0 | 42,5 |
| Color | colored | pale | pale |
| Viscosity | fluid | viscous | very viscous |

TABLE V-continued

| Temperature (°C.) | 54° | 48° | 55°→35° |
|---|---|---|---|
| Stability on storage | abundant alcoholic fermentation | very stable | very stable |

At high temperature, the soluble substances from the corn diffuse very rapidly. The phenomenon is slightly attenuated at 48° C. and, in the case of the dropping temperature profile, the diffusion takes place gradually, thus maintaining a very considerable fermentation zone.

At 54° C., the temperature is too high for optimum growth of the lactic bacteria and the bacterial activity is hence very mediocre. The latter is improved at 48° C. and becomes maximum for the dropping temperature profile. In the latter case, by reason of the almost total absence of reducing sugars at the end of the fermentation zone, yeasts cannot appear and the stability is hence excellent.

With a dropping temperature profile, the diffusion of the soluble substances, very gradual at the start of soaking, hence continuously supplies the lactic fermentation, which results in an almost total reduction of the reducing sugars as well as maximum exhaustion of lysine, histidine, arginine, aspartic acid and typrosine, as indicated by the free amino acid analysis shown in Table VI below.

TABLE VI

| Free amino-acids | Content in mg/100g of dry matter per | | |
|---|---|---|---|
| | 54° C. | 48° C. | 55° C.→35° C. |
| Lysine + Ornithine | 865 | 610 | 70 |
| Histidine | 330 | 50 | 0 |
| Arginine | 1010 | 140 | 0 |
| Asparatic acid | 825 | 60 | 65 |
| Threonine | 680 | 850 | 1060 |
| Serine | 640 | 600 | 860 |
| Glutamic acid | 950 | 1150 | 390 |
| Proline | 950 | 1530 | 1550 |
| Glycine | 410 | 540 | 560 |
| Alanine | 1195 | 2300 | 2480 |
| Cystine | — | — | — |
| Valine | 700 | 1100 | 1075 |
| Methionine | 310 | 450 | 560 |
| Isoleucine | 390 | 480 | 580 |
| Leucine | 1360 | 1730 | 2260 |
| Tyrosine | 515 | 60 | 60 |
| Phenyl-alanine | 640 | 730 | 800 |

EXAMPLE 3

The experimentation was conducted on an industrial scale in a starch factory where the crushing capacity was about 2200 tons of corn per day.

The soaking was carried out in twenty-two soak silos each of 180 tons of corn capacity.

The soak conditions utilized were as follows:

soak time of 36 hours,
$SO_2$ ratio=2.5 g/l,
cycling ratio=1 to 1.1 $m^3$ of water per ton of corn,
Temperature profile: 55° C. to 35° C. from the first silo receiving the fresh sulfited water, to the last silo receiving the fresh corn.

Figure 2:
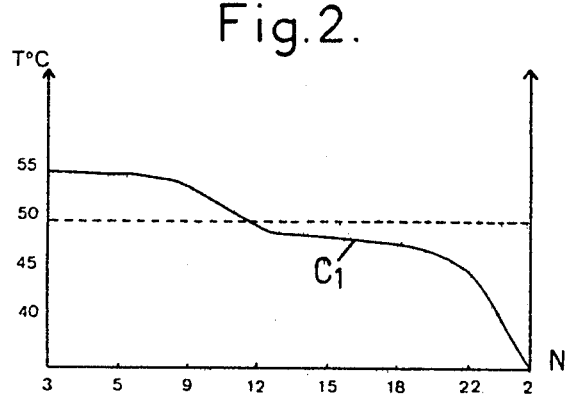
FIGS. 2 and 3 are curves showing temperature, solubles and RVA as a function of the process of liquid phase through a number of silos.
Figure 3:
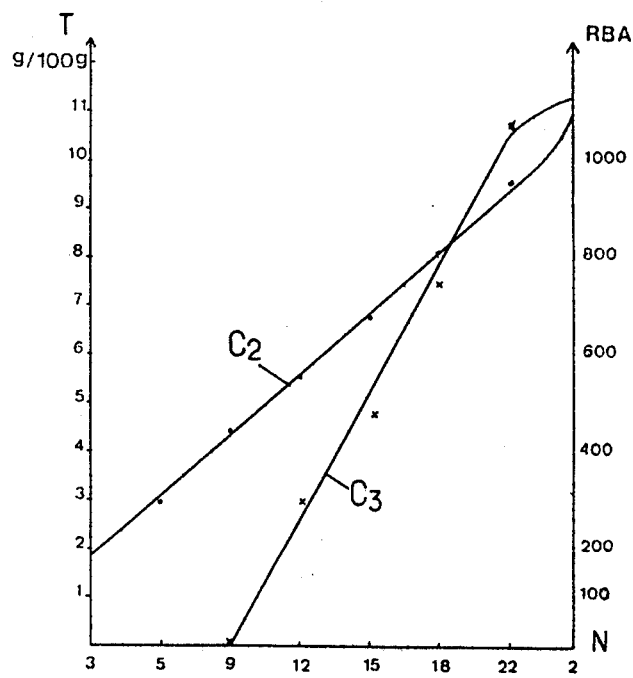
Figure 4:
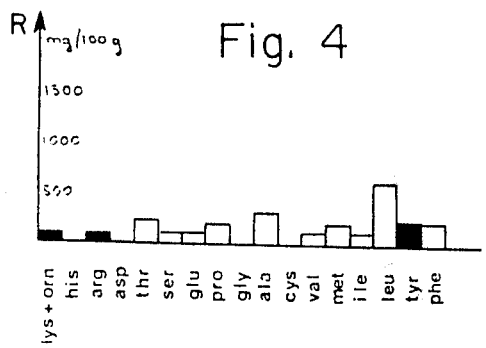
Figure 5:
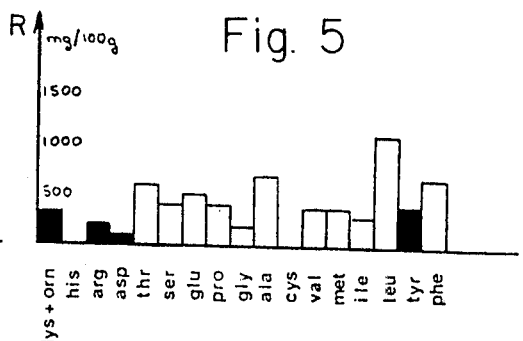
Figure 6:
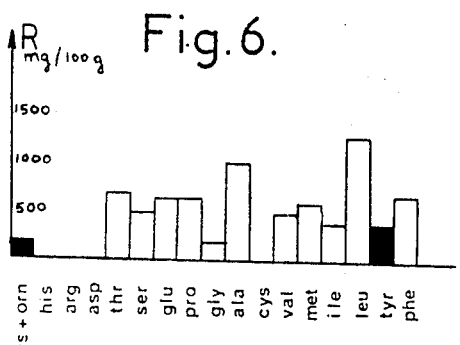
Figure 7:
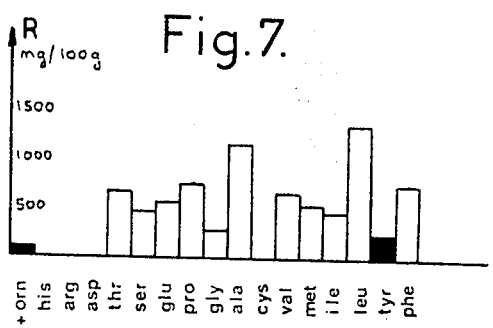
Figure 8:
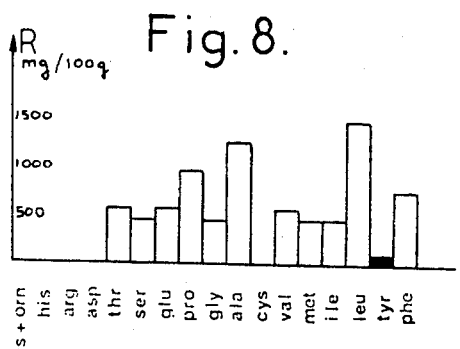
Figure 9:
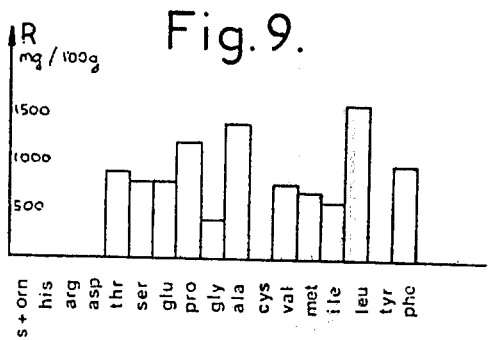
Figure 10:
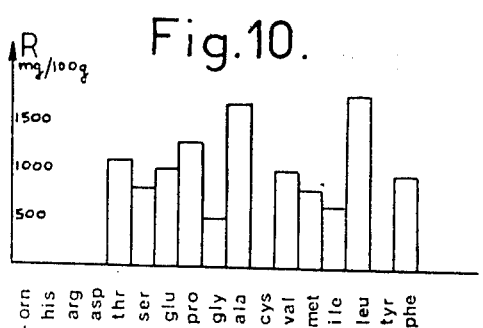

FIGS. 2 and 3 are two graphs showing, at a given moment, the variation of the temperature (curve $C_1$) and the level of solubles T expressed as g/100 g (curve $C_2$) and the R.V.A. (curve $C_3$) within different silos (as abscissae, the number N of the various silos is plotted), that is to say, as a function of the progress of the liquid phase, rising in counter-current to the soaking corn. At this given moment, the sulfited water is fed to silo No. 3, the steep water is emptied from silo No. 2 and the corn contained in the silo No. 1 leaves for the crushing step.

In the graph of FIG. 3 will be noted a very gradual diffusion of the soluble substances as well as the relative progress of the bacterial activity.

The solubles ratio of the output from the soak is in the neighborhood of 115 g/liter.

Analyses of the free amino-acids were carried out on silos No. 5, No. 9, No. 12, No. 15, No. 18, No. 22 and No. 2. The corresponding FIGS. 4 to 10 represent respectively the aminograms relative to soak water contained in these various silos, and the composition in lysine, histidine, arginine, aspartic acid and tyrosine will be particularly noted. On the aminogram of each Figure, are shown, expressed in mg/100 g of dry product, the content R of soak water of each of these silos in different amino acids.

It can be observed that after a certain accumulation in the diffusion zone, these amino-acids disappear gradually in the fermentation zone.

These soak conditions have been maintained constant for a period of twenty weeks. The constancy of the parameters is easily obtained by controlling the water cycling ratio and by keeping it between 1.0 and 1.1, and the temperature is that which is naturally obtained in this counter-current soaking process where the manufacturing water is supplied at about 55° C. and where the silo receiving the corn is kept at a temperature of 35° C.

Corn-Steep samples were analysed each weak. Tables VII and VIII show respectively the chemical composition and the free amino acid analysis of the Corn-Steeps obtained.

It can be observed, on examining these Tables, that the Corn-Steeps manufactured by the process according to the invention show an extremely regular composition, characterised by an almost total absence of reducing sugars and by a very low content of lysine, histidine, arginine, aspartic acid and tyrosine. This composition did not vary, whether the corn processed was of French or American origin.

The Corn-Steeps thus obtained were used for penicillin manufacture, after Corn-Steeps made by conventional soaking processes, that is to say, at a temperature of 48° C. throughout the soak and with a water cycling ratio of 1.4 to 1.6.

The graphs of FIGS. 11 to 14 show the comparative development of the lysine content of these Corn-Steeps and the relative average production of penicillin.

Thus, the graphs of FIGS. 11 and 13 show for each trial n the relative average production P in penicillin expressed in arbitrary units, the graph of FIG. 11 relating to Corn-Steeps made according to the prior art, that of FIG. 13 to Corn-Steeps made according to the invention. The figurative points of the various tests are located on curve $C_4$ as regards the graph of FIG. 11 and on the curve $C_5$ of FIG. 13.

The graphs of FIGS. 12 and 14 show, for each test n, the content of lysine K (mg/100 g) of the corresponding Corn-Steep. The graph of FIG. 12 relates to the Corn-Steeps of the prior art, that of FIG. 14 to those according to the invention. Here again, the figurative points of each test are located on the curve $C_6$ as regards FIG. 12 and on the curve $C_7$ as regards FIG. 14.

On examining these graphs, the existence of a close link between the composition of free lysine of the Corn-Steep and the penicillin production will be observed.

TABLE VII

| Week no. | Dry Matter | pH | Acidity g lacitic acid/ 100g dry matter | Sugars g glucose/100 g dry matter | Amino Nitrogen | Total Nitrogen | Proteins N × 6.25 | Ash | Phosphorus |
|---|---|---|---|---|---|---|---|---|---|
| 1 | 50,6 | 4,0 | 22,01 | Traces | 2,72 | 7,47 | 46,7 | 18,38 | 3,48 |
| 2 | 51,3 | 4,0 | 23,40 | Traces | 2,67 | 7,41 | 46,3 | 18,26 | 3,47 |
| 3 | 50,5 | 4,15 | 23,10 | Traces | 2,75 | 7,46 | 46,6 | 18,00 | 3,43 |
| 4 | 50,4 | 4,1 | 22,9 | Traces | 2,77 | 7,10 | 44,4 | 18,43 | 3,25 |
| 5 | 50,45 | 4,2 | 23,10 | Traces | 2,83 | 7,40 | 46,2 | 18,05 | 3,53 |
| 6 | 50,4 | 4,2 | 23,20 | Traces | 2,74 | 7,38 | 46,2 | 18,05 | 3,53 |
| 7 | 50,5 | 4,1 | 23,12 | Traces | 2,78 | 7,60 | 47,54 | 17,60 | 3,29 |
| 8 | 50,4 | 4,0 | 23,20 | Traces | 2,68 | 7,54 | 47,1 | 17,50 | 3,15 |
| 9 | 50,55 | 4,0 | 23,15 | Traces | 2,55 | 7,46 | 46,55 | 17,92 | 3,36 |
| 10 | 51,2 | 3,95 | 23,11 | Traces | 2,57 | 7,30 | 45,7 | 18,10 | 3,50 |
| 11 | 50,7 | 4,0 | 23,80 | Traces | 2,82 | 7,30 | 45,6 | 18,7 | 3,73 |
| 12 | 51,4 | 4,1 | 21,0 | Traces | 2,55 | 7,23 | 45,3 | 17,8 | 3,11 |
| 13 | 52,0 | 4,05 | 23,24 | Traces | 2,52 | 7,20 | 45,0 | 18,26 | 3,23 |
| 14 | 52,4 | 4,1 | 22,10 | Traces | 2,50 | 7,21 | 44,8 | 18,2 | 3,24 |
| 15 | 52,6 | 4,0 | 21,73 | Traces | 2,45 | 7,20 | 43,0 | 18,60 | 3,50 |
| 16 | 51,4 | 4,1 | 21,88 | Traces | 2,45 | 7,28 | 45,52 | 18,87 | 3,25 |
| 17 | 51,0 | 4,0 | 22,50 | Traces | 2,40 | 7,20 | 45,2 | 18,03 | 3,07 |
| 18 | 50,8 | 4,2 | 21,17 | Traces | 2,64 | 7,47 | 46,68 | 18,12 | 2,90 |
| 19 | 51,1 | 4,15 | 21,83 | Traces | 2,75 | 7,37 | 46,14 | 18,19 | 3,36 |
| 20 | 51,1 | 4,1 | 23,0 | Traces | 2,66 | 7,26 | 45,4 | 18,4 | 3,32 |

TABLE VIII

| Week no. | asparatic acid | tyrosine | lysine + ornithine | histidine | arginine |
|---|---|---|---|---|---|
| 1 | 63 | traces | 127 | traces | traces |
| 2 | 61 | traces | 156 | traces | traces |
| 3 | 0 | 81 | 121 | traces | traces |
| 4 | 40 | 80 | 80 | 20 | traces |
| 5 | 61 | 40 | 123 | 41 | traces |
| 6 | 40 | 100 | 60 | traces | traces |
| 7 | 40 | 80 | 60 | traces | traces |
| 8 | 40 | 80 | 80 | traces | traces |
| 9 | 60 | 100 | 60 | traces | traces |
| 10 | 80 | 120 | 110 | 40 | traces |
| 11 | 40 | 60 | 140 | traces | traces |
| 12 | 80 | 120 | 60 | 20 | traces |
| 13 | 80 | 100 | 120 | 20 | traces |
| 14 | 120 | 120 | 160 | 20 | traces |
| 15 | 100 | 100 | 140 | 60 | traces |
| 16 | 100 | 60 | 140 | 20 | traces |
| 17 | 60 |  | 100 | 20 | traces |
| 18 | 40 | 100 | 80 | 10 | traces |
| 19 | 20 | 40 | 60 | 20 | traces |
| 20 | 60 | 60 | 60 | 20 | traces |

Content in mg/100 g of dry matter

*traces = 10 mg/100 g of dry matter

As a result of which and whatever the embodiment adopted, there is thus provided a corn-steeping process having, with respect to those pre-existing, numerous advantages among which are:

that of providing a Corn-Steep of perfectly constant composition and particularly suited to the manufacture of penicillin, that of procuring appreciable gains on the score of energy balance, that of providing a Corn-Steep of excellent stability, that of providing a Corn-Steep peptonised to the maximum.

We claim:

1. Corn-steeping process producing corn-steep and comprising:

contacting corn grains placed in silos arranged in series with a steep water containing about 0.75 to 3 g sulfur dioxide per liter which water is introduced successively into each of the silos of the series such that the water traverses the silos one after the other, the volume of steep water in m³ introduced per ton of commercial corn defining a cycling ratio;

maintaining the temperature of the steep water such that the temperature decreases progressively from silo to silo as the water passes through the silos from one to the next, from at the most about 58° C. in the input silo to about 32° C. at the outlet of the silo from which corn steep liquor is recovered;

maintaining the cycling ratio between 0.8 and 1.2 m³ steep water per ton of commercial corn, maintaining the soak time, during which the corn grains and steep water are in contact, between about 24 to 44 hours.

2. Corn-steeping process according to claim 1, wherein the temperature of the steep water is maintained such that it decreases progressively from a value comprised between 52° and 56° C. in the input silo to a value comprised between 33° and 37° C. in the output silo.

3. Corn-steeping process according to claim 1, wherein the temperature of the steep water is maintained such that it decreases from 55° C. in the input silo to 35° C. in the output silo.

4. Corn-steeping process according to claim 1, wherein the cycling ratio is between 0.9 and 1.1 m³ of steep water per ton of commercial corn.

5. Corn-steeping process according to claim 2, wherein the cycling ratio is between 0.9 and 1.1 m³ of steep water per ton of commercial corn.

6. Corn-steeping process according to claim 3, wherein the cycling ratio is between 0.9 and 1.1 m³ of steep water per ton of commercial corn.

7. Corn-steeping process according to claim 1 wherein said steep water contains about 2.5 g sulfur dioxide per liter.

8. Corn-steep obtained using the process according to one of claims 1 to 6.

9. In the manufacture of antibiotics in which corn-steep is utilized as a source of nutrient substances, the improvement wherein said corn-steep is produced by the process of one of claims 1 to 7.

10. In the manufacture of penicillin in which corn-steep is utilized as a source of nutrient substances, the improvement wherein said corn-steep is produced by the process of one of claims 1-7.

* * * * *